Patented Mar. 16, 1948

2,437,998

UNITED STATES PATENT OFFICE 2,437,998

BETA-HALOGENATED UNSATURATED NITRILES

Albert M. Clifford and Joy G. Lichty, Stow, Ohio, assignors to Wingfoot Corporation, Akron, Ohio, a corporation of Delaware No Drawing. Application November 29, 1940, Serial No. 367,772

3 Claims. (Cl. 260—464)

This invention relates to unsaturated nitriles and to polymers containing the same. More particularly, it relates to a class of nitriles which contain halogen and are suitable for polymerization and to methods of preparing such nitriles and polymers.

It has been found that saturated nitriles may be treated to yield unsaturated bodies, the method resulting in the discovery of various new compounds. The present invention concerns acrylonitriles containing one or more halogen atoms in the molecule, at least one halogen atom being in the beta position. These new compounds correspond to the general formula

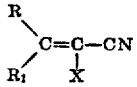

where X is selected from the group consisting of hydrogen, halogen, alkyl, halo alkyl, aryl, aralkyl, alkoxy and alicyclic radicals, R is halogen and $R_1$ is hydrogen or halogen. Thus, the compounds contain one halogen atom on the beta carbon atom and may contain two halogen atoms in this position or a halogen atom may be present in both the alpha and beta positions, but not more than two such atoms will be present on the alpha and beta carbon atoms together.

The class of new compounds is illustrated by alpha, beta-dichloro acrylonitrile, having the formula CHCl=CCl—CN, this compound being valuable in the formation of rubber-like materials by copolymerization with butadiene or with butadiene and another monomeric substance. Other compounds coming within the class are beta chlor acrylonitrile, beta brom acrylonitrile, alpha beta dibrom acrylonitrile, beta beta dichlor acrylonitrile, beta beta dibrom acrylonitrile, alpha brom beta chlor acrylonitrile, alpha chlor beta brom acrylonitrile, alpha methyl beta chloro acrylonitrile cis and trans, alpha methyl beta brom acrylonitrile cis and trans, alpha chloro methyl beta chlor acrylonitrile, alpha methyl beta beta dichlor acrylonitrile, alpha phenyl-beta chlor acrylonitrile, alpha methoxy beta chlor acrylonitrile, alpha ethyl beta chlor acrylonitrile, alpha chlor ethyl beta chlor acrylonitrile, alpha cyclohexyl beta chlor acrylonitrile, and alpha benzyl beta chlor acrylonitrile. Other compounds embraced by the formula given above are also included, the compounds mentioned being set forth only by way of illustration.

These compounds can be prepared by methods involving removal of hydrogen halide from a trihalo nitrile, by means of a dehydrohalogenating agent. Thus, alpha beta dichloro acrylonitrile may be obtained by removing hydrogen chloride from alpha alpha beta trichloro propionitrile, the reaction being as follows:

The hydrogen chloride may be removed by treatment with caustic soda or tertiary amines, for example, or it may be removed by pyrolysis of the trichloro propionitrile. The alpha beta dichloro acrylonitrile thus obtained has a boiling point of 59–60° C./60 mm., a density of $D_4^{25}$ 1.3445 and an index of refraction $N_D^{25}$ 1.4809

The cis and trans alpha-methyl-beta-chloro acrylonitriles may likewise be prepared by removing hydrogen chloride from the appropriate saturated nitriles, in this case dichlor isobutyro nitrile. The reaction is as follows

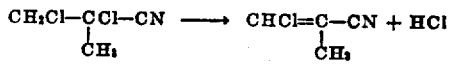

The hydrogen chloride may be removed by treatment with caustic soda or tertiary amines or other hydrogen halide removing agent. It may also be removed by pyrolysis of the saturated nitrile. This compound may also be prepared by pyrolyzing the acetylated cyanohydrin of chlor acetone to remove acetic acid. The two forms of this compound obtained are distinguished but not identified by the following physical characteristics: Boiling point 155–158° C., density $$D_4^{25} \ 1.0920$$

and index of refraction $$N_D^{25} \ 1.4584$$

and boiling point 126–128° C., density $$D_4^{25} \ 1.0762$$

and index of refraction $$N_D^{25} \ 1.4569$$

The halogen analysis compares closely with the theoretical.

The class of compounds set forth herein may be useful in the formation of plastic masses either by themselves or when copolymerized with other monomeric substances. Thus, they may be copolymerized with 1,3-butadiene or with substituted butadienes, such as isoprene, 2-3-dimethyl 1,3-butadiene, chloroprene, dichlor butadiene and the like. They may also be copolymerized with various esters of acrylic acids such as methyl acrylate, methyl methacrylate, ethyl acrylate, ethyl methacrylate, diethyl itaconate, dipropyl itaconate, dibutyl itaconate, dichloroacrylates, dibromacrylates, and the like. Copolymers are also obtained with various acrylonitriles such as acrylonitrile, methacrylonitrile and ethacrylonitrile. The nitriles and the esters of acrylic acids may be generally termed saponifiable derivatives of acrylic acids. Furthermore, rubber-like materials have been obtained from three component copolymers including one of the above described class of beta-halo-acrylonitriles, a butadiene and an ester or a nitrile of an acrylic acid.

Rubber-like copolymers were prepared from certain of the foregoing beta halo acrylonitriles by placing the monomers in selected proportions in a glass-lined container in an emulsion including an emulsifying agent, such as 6% Duponol, a buffer such as phosphate-citrate and a catalyst such as carbon tetrachloride. The oxygen is removed from the free space above the emulsion and the polymerization carried on at a temperature of 38° C. with agitation. Some of the results obtained are as follows:

It will be noted that plastic materials having good tensile strength and elongation and modulus satisfactory for a rubber-like product were obtained.

A series of polymerizations were also carried out with mixtures of one of the alpha methyl beta chloroacrylonitriles and butadiene, the mixture containing 40% of the nitrile and 60% of butadiene. The emulsion used was made up as follows:

| Buffer pH | Temp., °C. | Time | Per cent Yield |
|---|---|---|---|

TRANS (?) ALPHA-METHYL-BETA-CHLOROACRYLONITRILE

| Buffer pH | Temp., °C. | Time | Per cent Yield |
|---|---|---|---|
| 5.8 | 50 | 20 hrs. | 29.1 |
| 8.85 | 50 | ....do.... | 22.7 |
| 5.8 | 32 | 9 days | 35.6 |
| 4.7 | 50 | 10 days | 91.2 |
| 7.80 | 50 | ....do.... | 89.0 |
| 8.85 | 50 | ....do.... | 82.0 |
| H₂O | 50 | ....do.... | 81.1 |

CIS (?) ALPHA-METHYL-BETA-CHLOROACRYLONITRILE

| Buffer pH | Temp., °C. | Time | Per cent Yield |
|---|---|---|---|
| 4.7 | 50 | 6 days | 44.4 |
| 8.85 | 50 | ....do.... | 57.0 |

While there have been described above certain preferred embodiments of the invention, it will be apparent to those skilled in the art that various modifications and changes may be made therein without departing from the spirit of the invention or from the scope of the appended claims.

We claim:
1. Alpha methyl beta chloro acrylonitrile.
2. As new compositions of matter, the alpha alkyl beta halo acrylonitriles.
3. As a new chemical compound, a nitrile having the structural formula

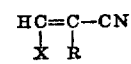

| Monomers | Ratio | pH | Time, hrs. | Yield | Properties |
|---|---|---|---|---|---|
| Butadiene | 70 | 6.5 | 12 | 62.5 | Tensile........170 Elong.........435 Modulus......93 |
| Ethacrylonitrile | 15 | | | | |
| Dichloroacrylonitrile | 15 | | | | |
| Butadiene | 70 | 6.5 | 42½ | 80.0 | Tensile........144 Elong.........400 Modulus......93 |
| Ethacrylonitrile | 15 | | | | |
| Dichloroacrylonitrile | 15 | | | | |
| Butadiene | 60 | 6.8 | 14½ | 63.0 | Tensile........241 Elong.........540 Modulus......128 |
| Dichloroacrylonitrile | 40 | | | | |
| Butadiene | 60 | 6.8 | 25¾ | 77.0 | Tensile........230 Elong.........580 Modulus......103 |
| Dichloroacrylonitrile | 40 | | | | |
| Butadiene | 70 | 6.8 | 31 | 64.5 | Tensile........241 Elong.........675 Modulus......86 |
| Dichloroacrylonitrile | 30 | | | | |
| Butadiene | 80 | 6.9 | 44 | 67 | Tensile........174 Elong.........570 Modulus......68 |
| Dichloroacrylonitrile | 20 | | | | |
| Butadiene | 70 | 6.95 | 23 | 78 | Tensile........200 Elong.........560 Modulus......73 |
| n-Bu-methacrylate | 15 | | | | |
| Dichloroacrylonitrile | 15 | | | | |
| Butadiene | 70 | 6.7 | 23 | 72 | Tensile........240 Elong.........615 Modulus......70 |
| Ethyl methacrylate | 15 | | | | |
| Dichloroacrylonitrile | 15 | | | | |
| Butadiene | 60 | 8.1 | 23 | 81 | Tensile........179 Elong.........595 Modulus......54 |
| Dibutyl itaconate | 20 | | | | |
| Dichloroacrylonitrile | 20 | | | | |
| Butadiene | 60 | 7.6 | 23 | 86 | Tensile........246 Elong.........515 Modulus......100 |
| Dimethyl itaconate | 20 | | | | |
| Dichloroacrylonitrile | 20 | | | | |
| Butadiene | 60 | 6.1 | 18 | 81.9 | |
| Me-chloroacrylate | 20 | | | | |
| Dichloroacrylonitrile | 20 | | | | | wherein X is a halogen atom and R is a radical of the group consisting of alkyl, halo alkyl, aryl, aralkyl, and alkoxy radicals.

ALBERT M. CLIFFORD.
JOY G. LICHTY.

REFERENCES CITED

The following references are of record in the file of this patent:

UNITED STATES PATENTS

| Number | Name | Date |
|---|---|---|
| 2,021,763 | Bauer et al. | Nov. 19, 1935 |
| 2,174,756 | Pieroh | Oct. 3, 1939 |
| 2,210,320 | Kautter | Aug. 6, 1940 |
| 2,231,623 | Habgood | Feb. 11, 1941 |
| 2,245,547 | Pollack | June 10, 1941 |
| 2,298,739 | Lichty | Oct. 13, 1942 |
| 2,328,984 | Lichty | Sept. 7, 1943 |

OTHER REFERENCES

Lespieau: Compt. rendus, vol. 130, page 1410 (1900).

Pfeiffer: Berichte, vol. 43, pages 3041–3045 (1910).

Boeseken et al.: Rec. des trav. Chim., vol. 32, page 101 (1911).

Certificate of Correction

Patent No. 2,437,998.    March 16, 1948.

ALBERT M. CLIFFORD ET AL.

It is hereby certified that error appears in the printed specification of the above numbered patent requiring correction as follows:

Column 4, line 22, in the table, first column thereof, for "7.80" read 7.0; and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.* wherein X is a halogen atom and R is a radical of the group consisting of alkyl, halo alkyl, aryl, aralkyl, and alkoxy radicals.

ALBERT M. CLIFFORD.
JOY G. LICHTY.

REFERENCES CITED

The following references are of record in the file of this patent:

UNITED STATES PATENTS

| Number | Name | Date |
|---|---|---|
| 2,021,763 | Bauer et al. | Nov. 19, 1935 |
| 2,174,756 | Pieroh | Oct. 3, 1939 |
| 2,210,320 | Kautter | Aug. 6, 1940 |
| 2,231,623 | Habgood | Feb. 11, 1941 |
| 2,245,547 | Pollack | June 10, 1941 |
| 2,298,739 | Lichty | Oct. 13, 1942 |
| 2,328,984 | Lichty | Sept. 7, 1943 |

OTHER REFERENCES

Lespieau: Compt. rendus, vol. 130, page 1410 (1900).

Pfeiffer: Berichte, vol. 43, pages 3041–3045 (1910).

Boeseken et al.: Rec. des trav. Chim., vol. 32, page 101 (1911).

Certificate of Correction

Patent No. 2,437,998.                                    March 16, 1948.

ALBERT M. CLIFFORD ET AL.

It is hereby certified that error appears in the printed specification of the above numbered patent requiring correction as follows:

Column 4, line 22, in the table, first column thereof, for "7.80" read 7.0;

and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.*